United States Patent [19]

Buchmeier

[11] Patent Number: 4,484,766

[45] Date of Patent: Nov. 27, 1984

[54] UNIVERSAL EXTENSION BRACKET FOR A SAFETY BELT ATTACHMENT FOR AUTOMOBILES

[76] Inventor: Robert B. Buchmeier, Waffenplatzstr. 87, 8002 Zürich, Switzerland

[21] Appl. No.: 461,355

[22] Filed: Jan. 27, 1983

[30] Foreign Application Priority Data

Dec. 2, 1982 [CH] Switzerland ............................ 873/82

[51] Int. Cl.³ ........................ A62B 35/02; B60R 21/10
[52] U.S. Cl. .................................. 280/808; 242/107.2; 297/476; 297/479
[58] Field of Search ............... 280/801, 806, 807, 808; 297/468, 474, 476, 479, 486; 242/107.12, 107.2, 107.6

[56] References Cited

U.S. PATENT DOCUMENTS

| | | | |
|---|---|---|---|
| 3,695,697 | 10/1972 | Stoffel | 297/479 |
| 4,136,422 | 1/1979 | Ivanov et al. | 280/801 |
| 4,209,142 | 6/1980 | Booth et al. | 280/808 |
| 4,243,185 | 1/1981 | Motonami et al. | 242/107.2 |
| 4,371,192 | 2/1983 | Alix | 280/801 |

Primary Examiner—Richard A. Bertsch
Attorney, Agent, or Firm—Lawrence Rosen

[57] ABSTRACT

This invention provides a universally applicable additional attachment capable of being adapted without any problems to all safety belt systems known to date. Such an attachment is provided with an additional brace, which permits connecting the base plate with the belt reverser arranged in the belt duct provided in the body of the vehicle. Said additional brace has two clamping elements, of which the second clamping element serves for resiliently connecting it with the base plate (10).

6 Claims, 7 Drawing Figures

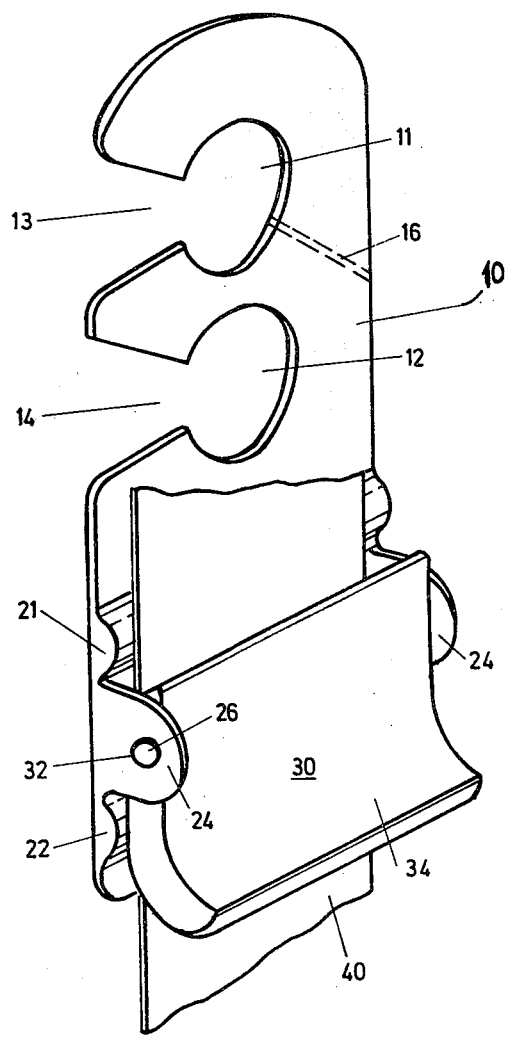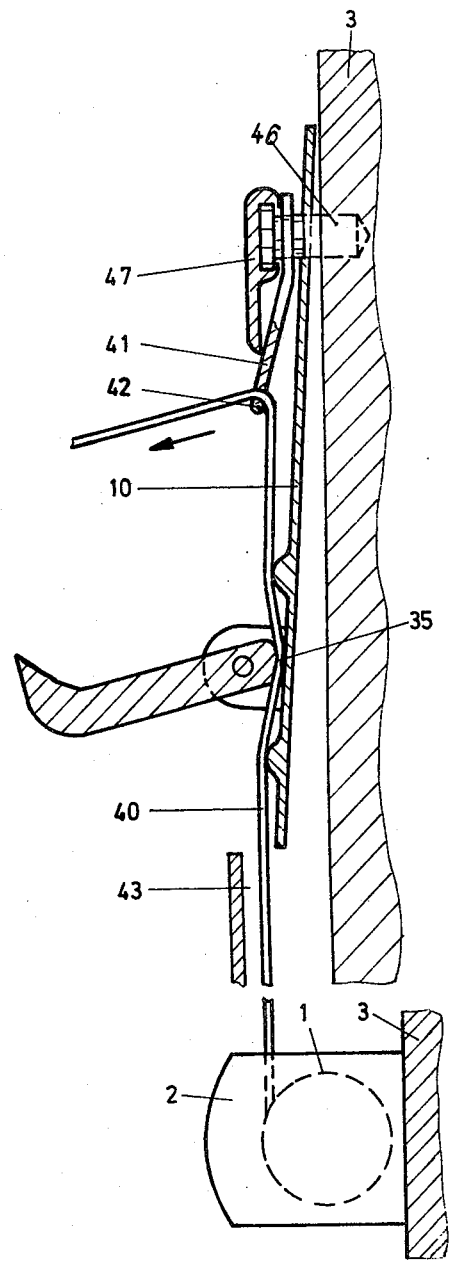
FIG. 1
FIG. 2
PRIOR ART

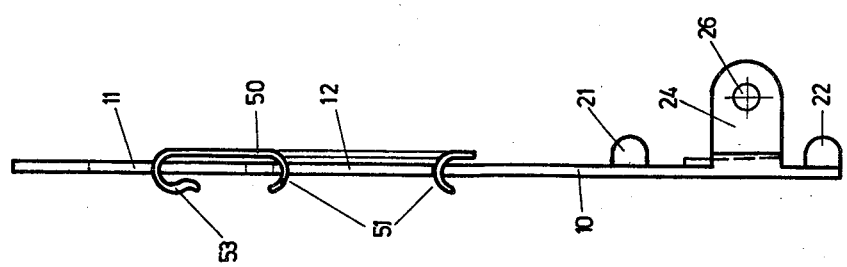
FIG. 6
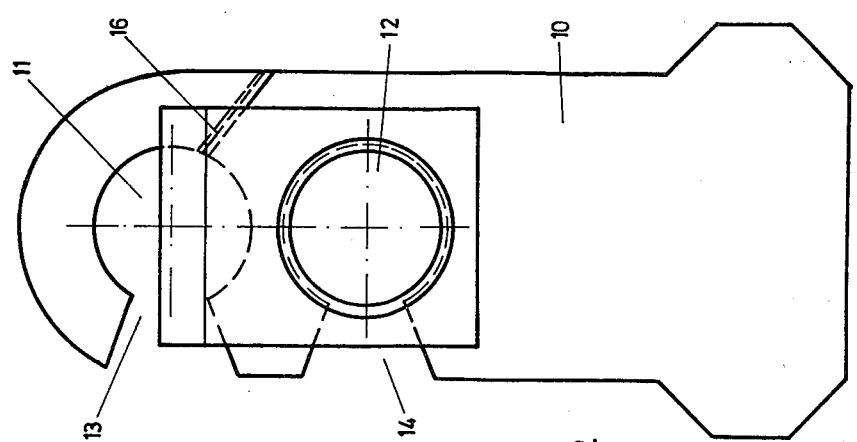
FIG. 3
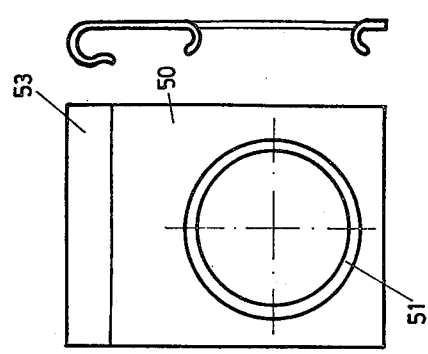
FIG. 5
FIG. 4

UNIVERSAL EXTENSION BRACKET FOR A SAFETY BELT ATTACHMENT FOR AUTOMOBILES

The present invention relates to an additional attachment for motor vehicle safety belts with an automatic rewinding device and comprising a base plate with a movable clamping part arranged thereon, as well as at least one fastening point for the base plate, and to the application of said attachment.

In connection with the safety belts known today and used in most cases, the one end of the belts is permanently retained by a spring-loaded roller in a wound and strained position in a way such that slow pullout motions of the seat belts and thus of the fastened occupant are permitted against the force of the spring. When a sudden motion occurs, i.e., high accelerations, the seat belts are blocked by the spring due to the mass moment of inertia as it may occur, for example, when the vehicle is suddenly retarded due to contact with an obstacle, and the belts are retained at their two ends, permitting the spring to perform the retaining function it is expected to perform.

Normally, said seat belts are currently fitted by the automobile manufacturers and mounted in different ways. The use of said belts, which are permanently under spring tension, is considered an inconvenience in many cases particularly because the belt is placed across the upper parts of the chest, thus causing many drivers to have a feeling of being constricted in an unpleasant way.

For this reason, an additional attachment was developed for motor vehicle safety belts of said type, said attachment making it possible to loosen the initial stress exerted on the belts by the spring, so that the user is not constricted by any belt pressure. Said additional attachment has been devised in a way such that the additional attachment is automatically opened when a sudden tractive force occurs against the pull of the built-in spring. This provides the belts with spring tension, so that also the blocking of the spring will function in the way explained in the foregoing.

Said known additional attachments are provided for those motor vehicles in which the seat belts are extended freely over a longer distance in the interior of the vehicle before they are reversed and fastening the user. Certain automobile manufacturers continue to use such short belt ducts. Also, said relatively long, free extensions over distances of 10 cm or more are found also in connection with belts that have been installed at a later time. However, also types of automobiles have become known in which the distance of free extension between the upper outlet of the belt duct and the point of reversal comes to only a few centimeters. Types are known also in which the reversing device is arranged directly hidden in ducts of the body of the vehicle, with the belts being guided outwardly only through a relatively narrow slot. The known additional attachments cannot be fitted with long belt-guiding ducts or closed guiding ducts as provided particularly in more expensive automobiles.

It is the purpose of the present invention to provide a universally applicable additional attachment that can be adapted without problems to all seat belt systems that have become known to date.

Such an additional attachment is characterized in that a hook-shaped element or organ, for example an additional brace, is provided which permits connecting the base plate with the belt-reversing device.

The object of the invention is explained by way of example in the following with the help of a drawing, in which:

FIG. 1 shows a perspective view of an additional attachment in the loosened condition, with a portion of the retracted belt;

FIG. 2 shows the lateral view of a belt system, partly schematically and partly in a sectional view, with a relatively long belt duct secured on the vehicle;

FIG. 3 illustrates a top view of an additional attachment according to FIG. 1, with the clamping part attached thereto;

FIG. 4 shows a top view of the clamping part;

Figure 7:
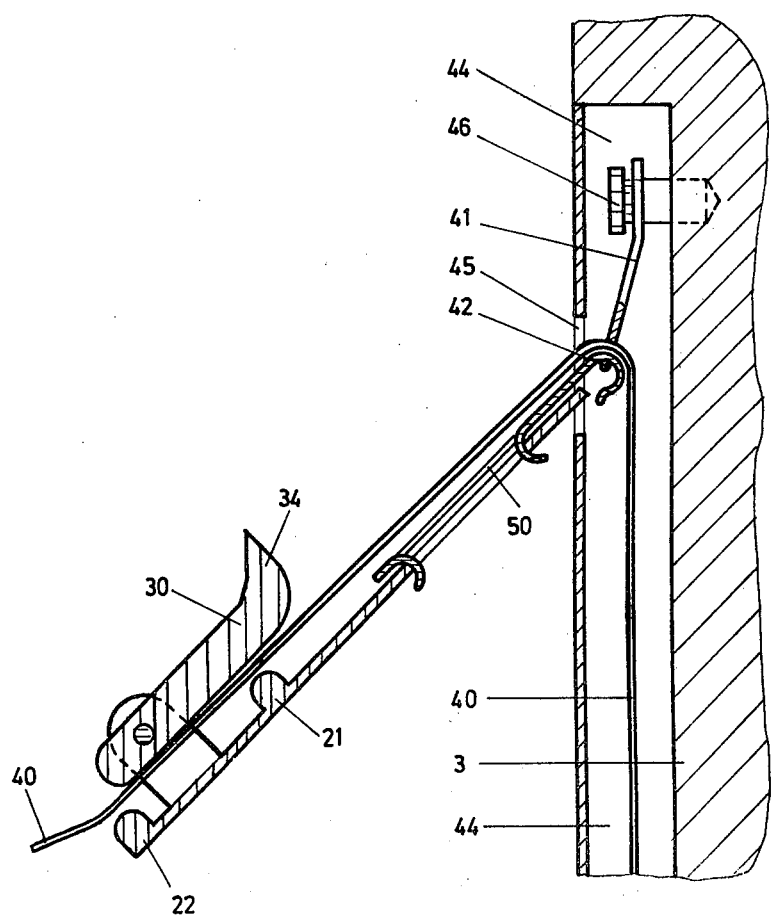

FIG. 5 a lateral view of the clamping part according to FIG. 4;

FIG. 6 shows a clamping part connected with the base plate of the additional attachment; and FIG. 7 a schematic view of a belt system partially shown in a section view, installed in an automobile having a belt duct arranged in a column of the body.

The arrangement for motor vehicle safety belts with an automatic rewinding device comprises a spring-loaded roller 1 with a housing 2 secured on a body 3 of a motor vehicle. The spring-loaded roller 1 serves for receiving a retaining belt 40 whose mode of function is explained in detail in a following portion of the present specification.

The additional attachment, which permits extending the retaining belt 40 in the loose condition across the chest of the driver to be fastened, has a base plate 10 with two apertures 11 and 12 arranged one on top of the other. The apertures 11 and 12 are open on one side by way of the expansions 13 and 14, respectively. Said apertures 11 and 12 serve for retaining the base plate 10 on a part of the body of the vehicle. The bridge between the two apertures 11 and 12 is flexible in a way such that for pushing-on the plate 10, the expansion inlet 13 or 14 can be extended without such extension causing a fracture of plate 10. Furthermore, the base plate 10 is provided with a separation joint 16 which permits breaking off the top portion when using the lower aperture 12, so that said portion will not interfere with the mounting of the other parts of the additional attachment. According to FIGS. 1 and 2, two elevations 21 and 22 are arranged in the lower portion of the base plate 10, with a bearing lug 24 with opening 26 being arranged in each case between said elevations and laterally of said elevations. Said bearing lugs serve for receiving two tenons 32 of a clamping part 30. The longer lever arm of said clamping part is provided in the form of a handle 34. whereas the shorter of said arms has a clamping area 35. When the clamping part 30 is pivoted outwardly in the manner shown in FIG. 2, the clamping surface 35 is forcing the retaining belt 40 against the base plate 10 and in this way is retaining the belt 40 against the force of the belt-retracting, spring-loaded roller 1.

FIG. 2 shows a portion of the interior of a motor vehicle fitted with a relatively long belt duct 43 which, however, does not extend up to a fastening screw 46 provided in the body of the car. In this case, the upper portion of the base plate 10 is broken off along separation joint 16 and the base plate 10 is pushed over the fastening screw 46 by way of its extension 14, so that said screw 46 is enclosed for the most part by the aperture 12. FIG. 2 shows that the screw 46 may be covered by a plastic cover 47 for the purpose of enhancing the appearance.

If the belt duct 43 leaves more space between its top end and the fastening screw 46, the additional attachment may be secured in the known manner on the upper aperture 11. If the duct of the belt is extended all the way up to the fastening screw 46, the additional attachment must be suspended in the belt reversing device 42 with the help of the additional brace as explained in the following.

However, motor vehicles are on the market today, and in particular more expensive automobiles, having a belt duct 44 installed in the manner shown in FIG. 7. The duct 44 is provided on the normal level with a slot 45 for extending the belt 40. In this case, the fastening screw 46 is secured in the interior of belt duct 44 as shown in the figure.

So as to permit the fitting of the additional attachment in a case of a belt system as shown in FIG. 7, said additional attachment is supplemented by an additional brace 50 having a flanged, preferably segmented edge 51 and an upper suspending device 53 in the form of a hook. The mounting of such a brace 50 is indicated in FIGS. 3 and 6. Said brace 50 may be made of an elastic material, for example steel sheet, plastic material or the like. Said brace permits advancing the front portion of the base plate 10 with the brace 50 mounted thereon and to suspend this structure around reverser 42 by means of the upper suspending device 53. The retaining belt 40 is then extended by way of the upper suspender 53 and brace 50, and subsequently comes to be extended between the clamping part 30 and the base plate 10. In this application, the clamping part 30 is pivoted in the bearing lugs 24 by 180 degrees as compared to the position according to FIG. 2, in a way such that another pull acting on the belt 40 in the direction of the arrow will swivel the clamping part 30 and disengage the clamping area 35 and the belt 40. In this way, the belt is again freely movable and under the pull of the spring-loaded roller 1.

Said design of the additional attachment with the resilient steel sheet leaf is capable of being installed with all motor vehicle safety belt systems known to date. If the belt duct is very short, the base plate is suspended in the upper opening 11, or in opening or aperture 12 with longer belt ducts, whereby the top portion of the base plate 10 is broken off along the separation joint 16. With seat belts which are completely installed in belt ducts 44 accommodated in the body of the vehicle as shown in FIG. 7, the additional attachment is arranged suspended as shown in FIG. 7. In any case, one pulling of the belt 40 against the spring force of roller 1 suffices to release said roller from the retention by means of the clamping part, and to subject said roller again to the tension or pull of the automatic rewinding device.

An analogous arrangement is provided if the reverser support 41 with the reverser 42 is secured at the top, for example on the roof, or if the slot 45 is provided in the roof.

I claim:

1. An extension bracket to be utilized with a belt attachment for motor vehicle safety belts that relieves the tension in the belt caused by an automatic rewinding device, said belt attachment generally comprising a base plate, a releasable belt clamping means attached to said base plate, means defining at least one opening in said base plate, and means disposed on said base plate for attaching said base plate to the motor vehicle, said extension bracket for the purpose of providing a universal adoptation of said belt attachment to various automobiles, said extension bracket comprising a generally flat plate having a rounded belt support at one end thereof, and a flared annular flange disposed about a mid-portion thereof for attachment within said one opening in said base plate of said belt attachment.

2. The extension bracket of claim 1, wherein said rounded belt support comprises a curved flange that extends over a top portion of said base plate of said belt attachment.

3. A combination belt attachment for motor vehicle safety belts that relieves the tension in the belt caused by an automatic rewinding device and an extension bracket for connection to said belt attachment for the purpose of providing a universal adaptation of said belt attachment to various automobiles, said belt attachment comprising a base plate, means defining at least one opening in said base plate, a releasable belt clamping means attached to said base plate, and means disposed on said base plate for attaching said base plate to the motor vehicle, said extension bracket comprising a generally flat plate having a rounded belt support at one end thereof, and a flared annular flange disposed about a mid-portion thereof and attached within said base plate opening of said belt attachment.

4. The combination belt attachment and extension bracket of claim 3, wherein said means defining at least one opening in said base plate includes a flexible partially circular orifice for receiving said annular flange of said extension bracket in a snap-in fashion.

5. The combination belt attachment and extension bracket of claim 4, wherein there are two openings in said base plate, and wherein said annular flange of said extension bracket can be received in either opening.

6. The combination belt attachment and extension bracket of claim 3, wherein said rounded belt support of said extension bracket comprises a curved flange that extends over a top portion of said base plate of said belt attachment.

* * * * *